Feb. 20, 1962  T. RIPEPI  3,022,499
APPROACH ALARM SYSTEM
Filed Nov. 16, 1959
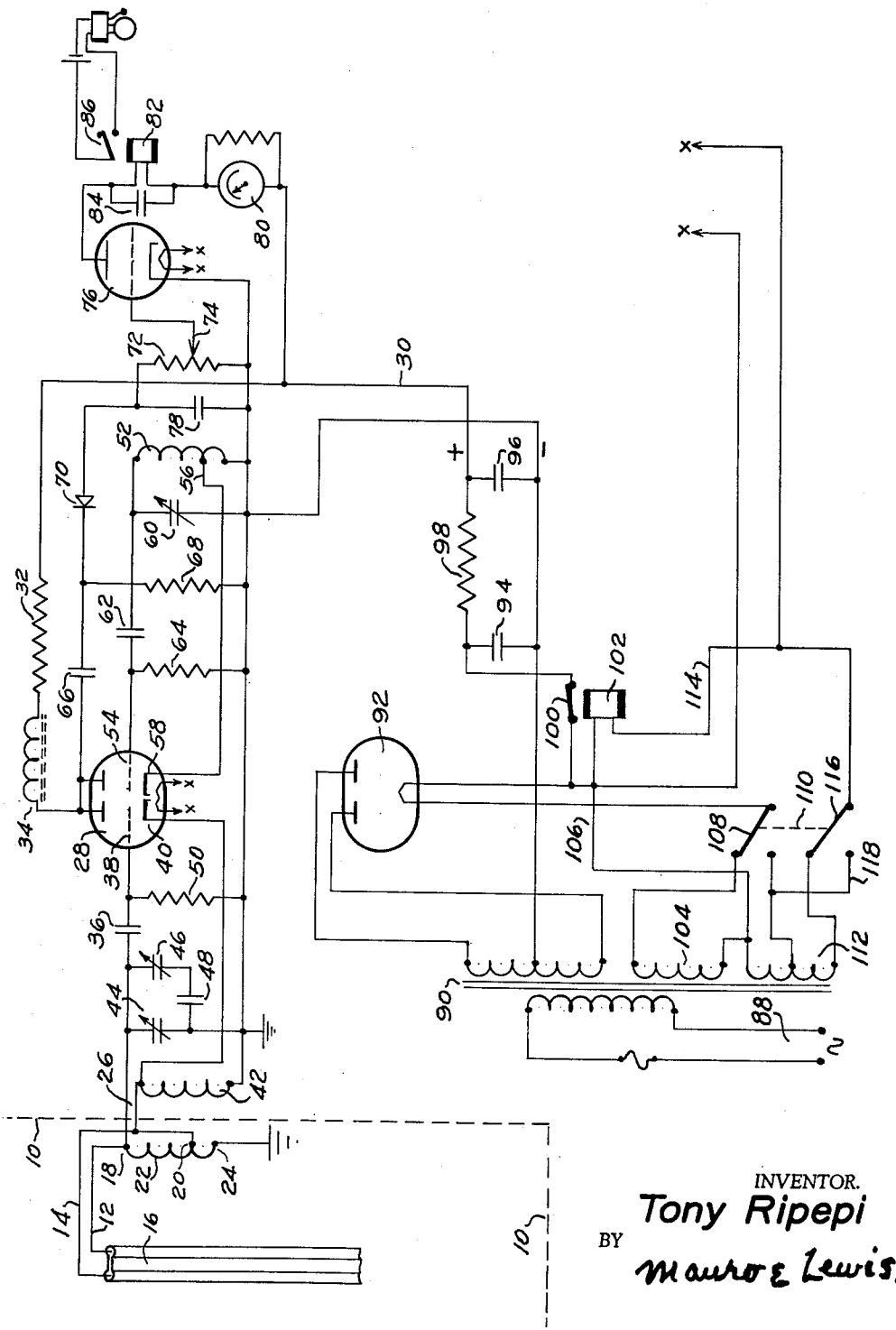
INVENTOR.
Tony Ripepi
BY
Mauro & Lewis.

United States Patent Office 3,022,499
Patented Feb. 20, 1962

3,022,499
APPROACH ALARM SYSTEM
Tony Ripepi, Clairton, Pa.
(771 Clairton Blvd., Pittsburgh 36, Pa.)
Filed Nov. 16, 1959, Ser. No. 853,135
2 Claims. (Cl. 340—258)

This invention relates to approach alarm systems of the type in which an area, room or premises are protected against unwarranted intrusion by the giving of an alarm, either locally or at a remote station.

Various kinds of arrangements of this type have been proposed, and the system of this invention falls within the category of devices which operate in response to a change in the effective capacitance, to ground, resulting from the approach of a person or, for that matter, any object of sufficient size. Systems of this type are known, in which the change in capacitance value which sets off the alarm or gives the signal is sensed as a change in the relative frequencies of two different electrical oscillators. All such prior arrangements have either been unreliable or subject to false triggering as by temperature or humidity changes, or have involved elaborate and expensive circuitry to compensate for such effects.

The present invention overcomes these objections to the known arrangements by utilizing a sensing circuit including a pair of physical conductors in or about the room, location or premises to be protected, the said conductors being cabled for ease of installation and to maintain their spacing and their characteristic impedance at fixed values. In addition, the sensing circuit includes a tapped inductance coil for coupling these two "antenna" conductors to a common ground at the protected location, for balancing purposes. Connections from the sensing conductors are extended to the measuring circuit and are coupled through similar inductance coils to the respective oscillators, to provide a self-balancing arrangement which is very sensitive to capacitance changes at the protected premises, yet is immune to false operation due to variations between that point and the measuring or indicating apparatus.

The invention utilizes the balancing coils also as the inductances of the conventional Hartley type of oscillator circuit, thereby minimizing the circuit complication. Finally, a further feature of the invention provides a low current-drain stand-by condition for the apparatus, to maintain it ready for rapid service while ensuring adequate life of the components.

The invention will best be understood by referring now to the following detailed specification of a preferred embodiment thereof, taken in connection with the appended drawing, whose single figure is a schematic wiring diagram of the invention.

The area to the upper left of the drawing, segregated by dash lines and indicated by reference numeral 10, designates a room or area to be protected against intrusion, and which is typically at some distance from the remainder of the installation comprising the generating and signalling equipment. The sensing conductors 12 and 14 form the two conductors of a transmission line cable 16 of the well-known ribbon twin-lead form used for example in television lead-in work, the flexible insulating body thereof permitting easy installation while maintaining the conductor spacing at the desired value to avoid discontinuities in the line. Such a cable is easily installed about the protected space, but for the purposes of the present invention it is not merely extended to the remote signal and sensing facility. Instead, it is terminated at the protected premises by connection to the upper and intermediate tap terminals 18 and 20 of a coil 22 which is conveniently of the tapped oscillator coil type as employed in the heterodyne circuit of an ordinary radio broadcast receiver.

The lower terminal 24 of coil 22 is connected to a local ground at the protected room or premises, and additional cabling 26 of the same twin lead type extends to the sensing and alarm equipment now to be described.

The sensing and alarm equipment comprises essentially a pair of independent but similar electron tube oscillators operated at the same nominal value of fundamental frequency, to produce a substantially zero beat output in the absence of a disturbance in the distributed capacitance at the protected premises. The oscillator outputs are combined to maintain an output amplifier in non-conducting or cut-off condition when this equality of oscillator frequencies exists. However, and since the antenna itself forms a part of the tuning or tank capacitance of one of the oscillators, any substantial change in the antenna capacitance, due for example to the presence of an intruder near the antenna, alters the frequency of that oscillator so that a beat note appears at the output of the combining circuitry. The output amplifier is no longer held in its nonconducting state, and current flows from that amplifier to an alarm relay whose contacts then operate to give the desired intrusion signal.

The active elements of both the sensing oscillator and the reference oscillator (herein shown as of the Hartley type) are for convenience constituted by the respective triode amplifier sections of a twin triode tube such as a RETMA type 6SN7 tube designated 28. Suitable plate voltage supply is provided over lead 30 via load resistor 32 and an RF choke 34 to minimize unwanted external radiation over the power line. The sensing oscillator includes the left-hand triode section of tube 28, and has as part of its tank circuit the antenna cable 16 and the tapped coil 22 whose upper terminal 18 is coupled over one of conductors 26 and coupling capacitor 36 to the grid 38, while its tap terminal 20 is connected over the other conductor 26 to the cathode 40.

A coil 42, which is a duplicate of coil 22, is connected from cathode 40 to ground, to provide proper matching from the sensing antenna to the sensing oscillator, and to tune out or neutralize the effects of stray capacitance of the leads 26. The fine adjustment of the frequency of this sensing oscillator is adjusted by the trimmer capacitors 44 and 46 in combination with fixed capacitor 48, and grid bias voltage for this triode section is provided by resistor 50. It will be observed that the capacitance-to-ground of the antenna cable 16 forms a part of the frequency-determining tank circuit for this oscillator.

The reference oscillator includes the right-hand triode section of tube 28, a third conventional oscillator coil 52 (a duplicate of coils 22 and 42) being connected between grid 54 and ground, over coupling condenser 62, with its intermediate tap 56 connected to cathode 58. A variable capacitor 60 across the coil permits adjustment of the frequency of this reference oscillator to equal that of the sensing oscillator for normal conditions in the protected space. Operating bias for the grid 54 is provided by resistor 64.

The output voltages of the two triode oscillator sections of tube 28 are combined by the RC time constant circuit consisting of capacitor 66 and resistor 68 in series. The values of these components are chosen so that the circuit presents in effect an open circuit at the oscillator frequencies which are in the range from 600 to 1,600 kilocycles per second, and also at the frequency corresponding to the heterodyne sum frequency when one oscillator is caused to vary from its assigned frequency. Upon a disturbance of the frequency of the sensing oscillator away from the frequency of the reference oscillator, due to a change of sufficient magnitude in the capacitance of antenna cable 16, in either the higher or lower direction, the composite wave including the relatively low (audio) difference frequency beat-note component is applied to the RC circuit, and condenser 66 charges up to some sensible level during each cycle of the difference beat frequency. The alternating voltage thus appearing across resistor 68 is detected by the crystal rectifier and mixer 70, and applied across the grid bias potentiometer 72, whose tap 74 is connected to the grid of power amplifier 76. Potentiometer 72 is shunted by the usual grid leak condenser 78.

Power amplifier tube 76 is supplied with plate voltage from lead 30 through a milliammeter 80 (to facilitate adjustments) and the operating coil of a sensitive relay 82, shunted by a large-capacitance condenser 84 for more positive operation of its contacts 86 during fluctuations of the plate current of tube 76. The potentiometer 72 is adjusted to hold tube 76 cut off and normally non-conducting for changes in the frequency of the sensing oscillator smaller than those which it is desired to sense, and hence provides a sensitivity adjustment. For frequency changes greater than these, the potential provided by detector-mixer 70 overcomes this cut-off bias and tube 76 conducts current through relay 82 to operate a lamp, bell or any other desired signal via contacts 86.

The power supply unit is of generally known type, powered from the alternating current mains 88 and a transformer 90 supplying a center-tapped voltage of typically 250 volts to the full-wave rectifier tube 92. Condensers 94, 96 and resistor 98 provide a simple smoothing filter, the positive output voltage being applied to lead 30 through the normally-open contacts 100 of a stand-by A.C.-operated relay 102.

The purpose of the stand-by operation is to provide an off duty condition in which power consumption is reduced, and alarms prevented, while maintaining all of the tube cathode heaters partially energized to permit rapid warm-up to fully stabilized operating conditions. It also minimizes the reduction in tube life resulting from repeated heavy inrush currents to the cathode heaters while in a cold condition.

The cathode heater of rectifier 92, in full operating condition, as shown, is energized from the 5 volt secondary winding 104 of transformer 90, over lead 106 and the contact 108 of stand-by switch 110. Lead 106 also connects relay 102 to one side of the 6.3 volt center-tapped heater winding 112 of the transformer, and the other terminal of the relay coil is connected to the opposite end of winding 112 by lead 114 and contact 116 of switch 110. Since the cathode heaters are connected at X—X across the relay coil, full 6.3-volt heater voltage is applied to them in this "operating" position of switch 110, and the relay is held operated.

To place the equipment in "stand-by" condition, switch 110 is operated to its other (lower) position not shown, in which contact 108 connects the 3.15 volt center-tap of winding 112 to the heater of tube 92, the return circuit to the top terminal of winding 112 including conductor 106. At the same time, switch contact 116 connects the heater supply circuit X—X also to this reduced voltage winding, by conductor 118. This reduced voltage, also now applied to relay 102, is insufficient to maintain the same in operated condition, and it releases and opens the plate supply lead at its contacts 100, and prevents application of even a reduced plate supply voltage to tubes 28 and 76. Since the opening of the plate supply circuit ahead of filter 94—96—98 prevents any current path through tube 92, the heater life of this tube also is prolonged.

The operating condition is restored merely by returning switch 110 to its upper position, as shown in the drawing, to reconnect the high voltage supply and to rapidly raise the cathode heaters to their normal operating temperatures.

Typical suitable circuit values are given as follows, by way of illustration:

Capacitors:
  44, 46 and 60_____ 100–365 mmfd. trimmers.
  48_____ 30 mmfd. ceramic.
  36 and 62_____ 100 mmfd. ceramic
  66_____ .05 mfd.—600 volt.
  78_____ .01 mfd.—600 volt.
  84_____ .5 mfd.—600 volt.
  94 and 96_____ 15/15 mfd. dual electrolytic.
Resistors:
  50 and 64_____ 47,000 ohms—1 watt.
  32_____ 390 ohms—2 watts.
  68_____ 6,800 ohms—1 watt.
  72_____ .5 megohm potentiometer.
  98_____ 3,000 ohm—5 watt wirewound.
  Meter shunt_____ 16 ohms—2 watt.
Inductor 34_____ 10 millihenry RF choke.
Tubes:
  28 and 76_____ Retma Type 6SN7.
  92_____ Retma Type 5Y3GT.
Diode 70_____ Retma Type 1N34.

While the invention has been described in considerable detail, in order to enable those skilled in the art to practice the same, no unnecessary limitations are intended to be thereby imposed on the novel features of the invention as defined in the appended claims.

What is claimed is:

1. A body-capacity intrusion sensing circuit comprising a pair of matched oscillators each including a tapped oscillator coil coupling the grid-cathode and plate-cathode circuits of respective triode amplifiers, one of said coils being located remotely from its associated amplifier with an end portion of its winding connected to said amplifier over a balanced line, the other end of said winding being grounded, a balanced-line sensing antenna connected across said end portion of the said remotely-located coil, a balancing inductance connected in the grid-to-cathode path of said associated amplifier for neutralizing stray capacitance in the balanced-line connections from that amplifier to the remote coil, means for adjusting the frequencies of both oscillators to substantial equality, and a combined mixing and detecting circuit connected to the outputs of both said oscillators for causing a signal operation upon the occurrence of a substantial change in the frequency of the oscillator controlled by said antenna.

2. Apparatus in accordance with claim 1, in which said mixing and detecting circuit includes an RC time-constant circuit and a diode detector connected to the outputs of both said oscillators for causing a signal operation upon the occurrence of a substantial change in the frequency of the oscillator controlled by said antenna.

References Cited in the file of this patent

UNITED STATES PATENTS

| | | |
|---|---|---|
| 1,766,038 | Gebhard | June 24, 1930 |
| 2,390,221 | Lindsay et al. | Dec. 4, 1945 |
| 2,393,717 | Speaker | Jan. 29, 1946 |
| 2,507,282 | Stivin | May 9, 1950 |
| 2,621,517 | Sontheimer | Dec. 16, 1952 |
| 2,646,559 | Nutzler | July 21, 1953 |